United States Patent
Viger et al.

(10) Patent No.: US 7,457,820 B1
(45) Date of Patent: Nov. 25, 2008

(54) METHOD OF DISTRIBUTING MULTIRESOLUTION DIGITAL DOCUMENTS

(75) Inventors: Pascal Viger, Coesmes (FR); Frederic Maze, Rennes (FR); Ioana Donescu, Rennes (FR); Eric Nassor, Thorigne Fouillard (FR)

(73) Assignee: Canon Kabushiki Kaisha, Tokyo (JP)

( * ) Notice: Subject to any disclaimer, the term of this patent is extended or adjusted under 35 U.S.C. 154(b) by 250 days.

(21) Appl. No.: 10/833,127

(22) Filed: Apr. 28, 2004

(30) Foreign Application Priority Data

May 7, 2003 (FR) ................................. 03 05570

(51) Int. Cl.
*G06F 7/00* (2006.01)

(52) U.S. Cl. ........................ 707/103 R; 707/9

(58) Field of Classification Search ............... 715/530, 715/517; 707/530, 100–102, 200–203, 103 R, 707/9, 10
See application file for complete search history.

(56) References Cited

U.S. PATENT DOCUMENTS

| | | | |
|---|---|---|---|
| 5,949,551 A | 9/1999 | Miller et al. | 358/408 |
| 6,708,309 B1 * | 3/2004 | Blumberg | 715/530 |
| 2002/0056010 A1 | 5/2002 | Lincoln et al. | 709/247 |
| 2002/0112001 A1 | 8/2002 | Sutherland et al. | 709/203 |
| 2003/0144917 A1 * | 7/2003 | Sailus et al. | 705/26 |

FOREIGN PATENT DOCUMENTS

| | | |
|---|---|---|
| EP | 1 133 104 A2 | 9/2001 |
| JP | 10-334028 | 12/1998 |
| JP | 2002-312403 A | 10/2002 |
| WO | 01/84799 A2 | 11/2001 |

OTHER PUBLICATIONS

Microsoft Press Computer Dictionary 3th edition, p. 430. Copyright @ 1997.*

Office action mailed Aug. 24, 2007 for corresponding Japanese Patent Application No. 2004-139044.

* cited by examiner

*Primary Examiner*—Wilson Lee
(74) *Attorney, Agent, or Firm*—Fitzpatrick, Cella, Harper & Scinto (57) ABSTRACT

In a method of controlling a document sharing support apparatus, there is received information representing the fact that a first computer is storing at least a low-resolution version of a document, and the low-resolution version of the document is acquired and stored. There is received a request for obtaining the document from a second computer, and the low-resolution version of the document in memory is made available to the second computer.

8 Claims, 4 Drawing Sheets

METHOD OF DISTRIBUTING MULTIRESOLUTION DIGITAL DOCUMENTS

BACKGROUND OF THE INVENTION

The present invention relates to a method of archiving and a method of distributing digital documents available in several resolutions in a telecommunications network.

The invention also relates to a device for archiving and a device for distributing such documents.

More particularly, the invention aims to improve the quality of service in systems distributing multiresolution digital documents in a network with a "peer to peer" topology.

It should be stated for this purpose that a network can be termed a network with a "peer to peer" topology when the various items of equipment in this network (clients, servers) put resources in common according to an equal to equal sharing philosophy. Such networks are in contradiction in particular to networks of the conventional "client-server" types in which the shared information is archived in a central server. They are used advantageously for the distribution of shared data, their storage capacity being in fact unlimited.

The document WO01/84799 (Napster) describes a system of sharing digital resources in a network with a "peer to peer" topology.

The distribution system described in the Napster document comprises a central server storing, for each shared resource on the network, a list of systems for archiving this resource.

Thus, when a client device wishes to gain access to a shared resource, it can obtain, following the sending of a request to this centralized server, the address of a system archiving this resource, and then obtain the said resource directly from the archiving system selected by the centralized server.

Unfortunately, the distribution system described in the Napster document does not propose any solution for obtaining resources requested by the client device when all the archive systems as aforementioned are out of use or out of reach, for example because they are disconnected from the network. The Napster system therefore does not provide a minimum quality of service and because of this the resource is completely unavailable to third party client systems.

In order to resolve this problem, namely to guarantee a certain quality of service in a document distribution system in a network with a peer to peer topology, the inventors first of all imagined a distribution system in which a low-resolution version of the documents was archived in a central server in the network.

During the implementation of this solution, the inventors were confronted with the problem of the obtaining, by the centralized server, of the low-resolution version of the digital document.

The document U.S. Pat. No. 5,949,551 (Kodak) proposes a system of archiving digital images in a central server in a network, this central server storing, for each image, a low-resolution version of this image, this low-resolution version being systematically supplied to the central server by the client system wishing to share the original image.

Because of its centralized character, the archiving system according to Kodak does not make it possible to take advantage of the peer to peer topology, in which the resources can be replicated on several client systems.

The client systems in a "peer to peer" network are hybrid systems, having varied processing, storage and network communication capacities, none of them being capable, at least to the same extent, of obtaining a low-resolution version of a document and supplying this to the central server.

The Kodak solution, not taking account of the aforementioned characteristics, does not allow optimum use of the resources of a peer to peer topology.

SUMMARY OF THE INVENTION

The invention aims to resolve the aforementioned problems.

Thus, and according to a first aspect, the invention concerns a method of archiving, in a server on a telecommunications network, a low-resolution version of a digital document, at least one high-resolution version of which is archived by an archiving system in the network, the method comprising the following steps:
- receiving an identifier of the low-resolution version coming from the archiving system;
- the sending, by the server, of a request to a processing system in the network, with a view to obtaining the low-resolution version;
- obtaining the low-resolution version coming from the processing system; and
- archiving the low-resolution version in a memory of the server.

In the remainder of this document, the following terminology will be used:
"archiving system": system in the peer to peer network storing a high-resolution version of a shared digital document;
"client system": system in the peer to peer network wishing to share a digital document or to access the high-resolution version of a shared digital document;
"server": central system in the peer to peer network storing a low-resolution version of a digital document and adapted to supply to a client system the address of a system archiving the high-resolution version of this document;
"processing system": system in the peer to peer network adapted to obtain a low-resolution version of a digital document and to supply this to the server at the request of the latter.

Naturally, a system in the peer to peer network can behave at the same time as an archiving system and/or a client system and/or a server and/or a processing system.

In accordance with the archiving method according to the invention, the server can thus advantageously obtain the low-resolution version of the document to be shared from a processing system in the network whose computing capacities are adapted to perform this operation, and not necessarily from the system archiving the high-resolution document.

In addition, the server can advantageously manage the load on its network communications, proceeding with the obtaining of the low-resolution versions of the digital documents only at times which it considers to be opportune according to this load.

In a preferred embodiment, the identifier of the low-resolution version of the digital document is a single identifier making it possible to identify all the versions of this document, and in particular the versions corresponding to the various resolutions of this document.

This advantageously, as described below, simplifies the distribution system according to the invention, this system being adapted to supply, in order to guarantee a certain quality of service, a low-resolution version of a document when a higher-resolution version is not accessible.

Preferably, the archiving method according to the invention also comprises, prior to the sending step, a step of seeking the low-resolution version in the server memory.

This search step thus avoids the downloading of a low-resolution version if the latter is already available in the server memory.

According to another advantageous characteristic, the archiving method comprises, prior to the sending step, a step of selecting the processing system according to at least one predetermined criterion chosen from amongst:

a processing capacity of the processing system; and the bandwidth available on the network between the server and the processing system.

The downloading of the low-resolution version to the server can thus be performed effectively, either by performing this downloading from a processing system possessing high computing capacities, or using a lightly loaded network link.

In a preferred embodiment, the identifier reception step is a step of receiving a collection of digital documents, this collection including the identifier.

The invention can thus advantageously be used for the archiving and distribution of digital documents belonging to a collection of documents rather than only for the archiving and distribution of isolated digital documents.

Correspondingly, the invention concerns a device for archiving a low-resolution version of a digital document, at least one high-resolution version of which is archived by an archiving system in a telecommunications network, this archiving device being able to be incorporated in a server in a network and comprising:

means of receiving an identifier of the low-resolution version coming from the archiving system;

means of sending a request to a processing system in the network, with a view to obtaining the low-resolution version;

means of obtaining the low-resolution version coming from the processing system; and means of archiving the low-resolution version in a memory of the server.

According to a second aspect, the invention concerns a method, able to be implemented in a server in a telecommunications network, of distributing a high-resolution version of a digital document archived in at least one archiving system in the network, the method being characterized in that, a low-resolution version of the digital document having been archived in the server in accordance with the archiving method as briefly described above, it comprises:

a step of receiving a request coming from a client system with a view to obtaining the high-resolution version of the digital document;

a step of selecting a system for archiving the high-resolution version;

a step of sending, to the client system, on reception of said request, the address of the archiving system selected; and a step of making the low-resolution version available to said client system.

This distribution method thus guarantees a certain quality of service since it enables the client system, when an archiving system is out of use or out of reach, to access a low-resolution version of the document from the centralized server, such a server being by nature adapted to be accessed in an almost continuous fashion by the network clients.

In a preferred embodiment, the distribution method also comprises a programming step with a view to the deferred downloading of the high-resolution version of the digital document in a memory of the server, this programming step being implemented if no archiving system comprising said high-resolution version is available on the network.

This characteristic advantageously makes it possible to offer subsequently, to the client system, a high-resolution version of the digital document when the latter temporarily cannot be obtained by the client from the archiving systems following its initial request to obtain.

In this preferred embodiment, the distribution method preferentially comprises, following on from the programming step, a step during which the server regularly checks, during a predetermined period, whether at least one archiving system containing the high-resolution version of the image has reconnected to the server. The downloading is then performed, where necessary, from this newly reconnected archiving system.

In a preferred fashion, the distribution method comprises, following on from the downloading, the sending of an information message to the client in order to notify it of the temporary making available of the high-resolution version of the image in the server memory.

The temporary storage of the high-resolution version, in particular when it is accompanied by the aforementioned notification, thus further improves the quality of service of the distribution system according to the invention.

Correspondingly, the invention concerns a device, able to be incorporated in a server in a telecommunications network, for distributing a high-resolution version of a digital document archived in at least one archiving system in the network, characterized in that it comprises:

a device for archiving a low-resolution version of the digital document in accordance with an archiving device as briefly described above;

means of receiving a request coming from a client system with a view to obtaining the high-resolution version of the digital document;

means of selecting a system for archiving the high-resolution version;

means of sending, to this client system, on reception of the request, the address of the archiving system selected; and means of making the low-resolution version available to the client system.

The invention also relates to a server comprising means adapted to implement an archiving method and a distribution method as briefly described above.

The invention also relates to a server in a telecommunications network comprising:

means of storing at least one address of a processing system and at least one address of an archiving system on said network; and a distribution device as briefly described above.

The invention also relates to a server adapted to implement an archiving method and a distribution method as briefly described above.

In a variant embodiment, this server also comprises:

means of receiving a request to print a digital document coming from a client system;

means of downloading the digital document from the archiving system selected; and means of printing the digital document.

Thus the server can be used for implementing a service of printing a remote digital document, this service being accessible to the systems in the network having knowledge of an identifier of this document. The printed document can for example be sent to a user of the client system, for example by mail.

In another embodiment, the server also comprises means of programming the downloading of the high-resolution version of the digital document.

This characteristic advantageously makes it possible to subsequently offer a high-resolution version of the digital document when this temporarily cannot be obtained by the server from an archiving system.

The invention also relates to a system of distributing multiresolution digital documents comprising a server from amongst those briefly described above.

The invention also relates to an information medium which can be read by a computer system, possibly totally or partially removable, in particular a CD-ROM or magnetic medium such as a hard disk or a diskette, or a transmittable medium such as an electrical or optical signal, this information medium containing instructions of a computer program for implementing an archiving method or a distribution method as briefly disclosed above, when this program is loaded in and executed by a computer system.

The invention also relates to a computer program stored on an information carrier, this program containing instructions for implementing an archiving method or a distribution method as briefly described above, when this program is loaded in and executed by a computer system.

The particular advantages of the archiving device, of the distribution device, of the servers, of the network, of the information media and of the computer programs being identical to those of the archiving and distribution methods previously described, they will not be repeated here.

Other aspects and advantages of the present invention will emerge more clearly from a reading of the description of particular embodiments which follow, this description being given solely by way of non-limiting example and made with reference to the accompanying drawings, in which:

DETAILED DESCRIPTION OF THE PREFERRED EMBODIMENTS

In the following description given by way of example, the case is adopted of the sharing of a collection of digital images by an archiving system in a network of the "peer to peer" type.

In this context, the term:

"thumbnail" will be used for the low-resolution version of a digital image; and

"image" will be used for the high-resolution version of this digital image.

Figure 1:
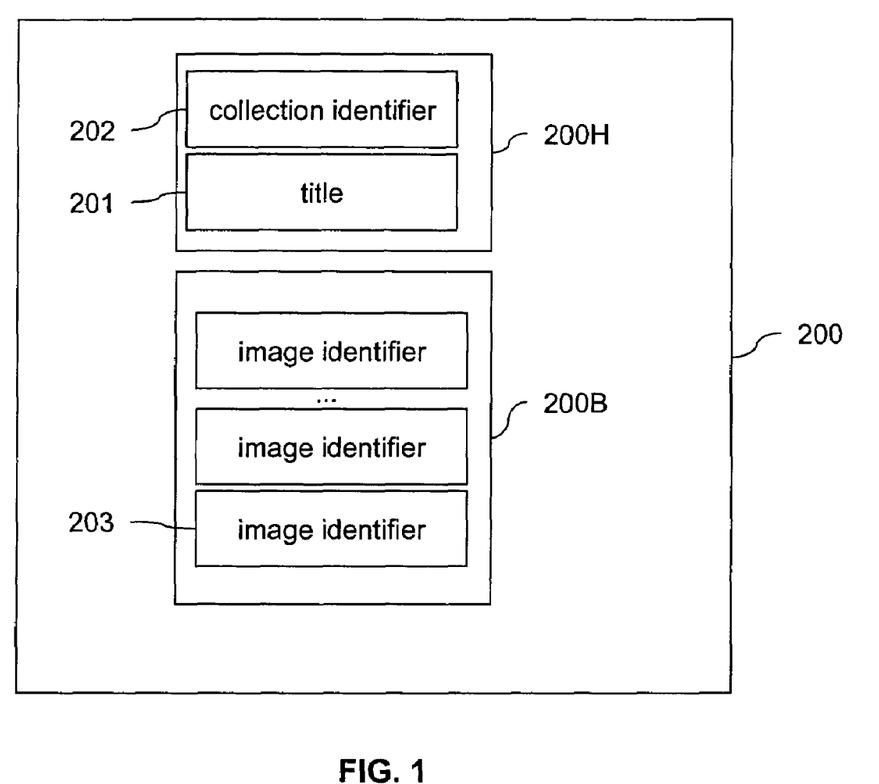
FIG. 1 depicts a collection of digital image identifiers in accordance with the present invention.

FIG. 1 depicts schematically a collection 200 of digital image identifiers 203.

The creation of a collection of digital images is known to persons skilled in the art and will not be described here. It consists of associating these images with an image container (also referred to as a "collection"), for example by means of an appropriate graphical interface of the client system according to the invention.

In the preferred embodiment described here, all the versions of the digital image, namely in particular the thumbnail, have the same single identifier 203.

For reasons of simplification of the description, the thumbnail and image identified by the single identifier 203 will be called respectively "thumbnail 203" and "image 203".

It should be noted however that the invention is not restricted solely to two resolutions of an image, but can be applied to an image in multiresolution format. A version with a resolution greater than the resolution of the "thumbnail" version will be designated a high-resolution version (referred to as the image 203).

In practice, in the preferred embodiment described here, the single identifier 203 is automatically generated as soon as a new image is added to a collection.

In order to determine the version of the digital document identified by the single identifier 203, this identifier is associated with a data "type".

In the example described here, this "type" can take two values, namely the "thumbnail" type and the "image" type.

In the preferred embodiment described here, the identifier 203 of the thumbnail is obtained from a collection of images identified by the single identifier 202.

In the preferred embodiment described here, a collection 200 comprises:

firstly a header 200H, comprising a title 201 and an identifier 202 of the collection; and secondly, a body 200B, comprising a list of identifiers 203 of the digital images in this collection.

A collection 200 can possibly itself comprise one or more other collections, that is to say the collection 200 can contain in its part 200B at least the identifier 202 of another collection.

Figure 2:
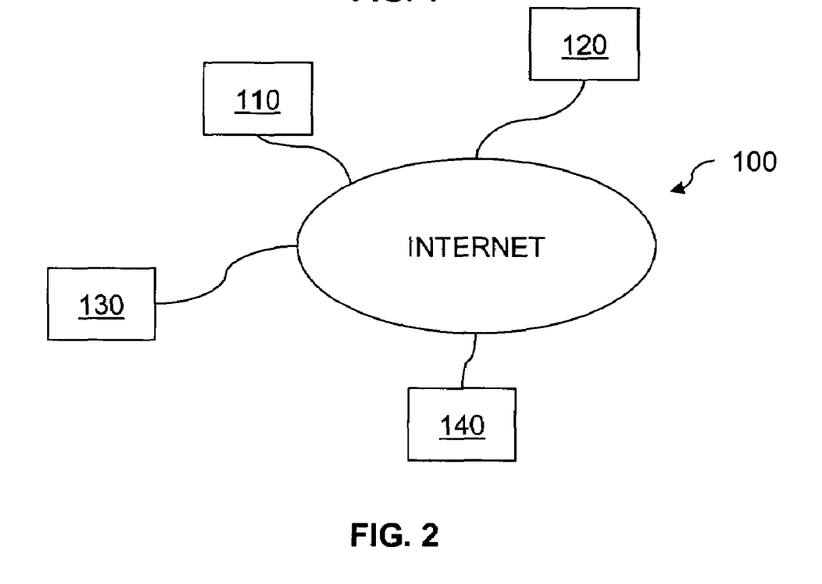
FIG. 2 depicts a system for distributing multiresolution digital documents in accordance with the present invention.

FIG. 2 depicts a digital image distribution system 100 according to the present invention.

The image distribution system 100 comprises various computer systems 110, 120, 130 and 140 connected to a telecommunications network in accordance with a topology of the "peer to peer" type.

Preferably, the telecommunications network is of the "Internet" type. It may also be a private local network, a public network, a mobile telecommunications network or any other type of network.

To facilitate the description, it will be assumed in the description given by way of example which follows that these computer systems are respectively, within the meaning of the invention:

a server 110;
an archiving system 120;
a processing system 130; and
a client system 140.

According to the practice of networks with a "peer to peer" topology, the majority of computer systems 110, 120, 130 and 140 combine several functions, namely the functions of an archiving system and those of a client system according to the invention.

The various computer systems can be connected to the telecommunications network by hardware means (modem, network card etc) and appropriate dedicated software, these connection means implementing for example a telecommunications standard such as the Ethernet, ADSL or UMTS standard.

In the system described here, the archiving system 120, the processing system 130 and the client system 140 communicate with the central server 110 according to a protocol of the conventional "client-server" type known to persons skilled in the art.

Communications can also be established directly between the archiving system 120, the processing system 130 and the client system 140.

In the system described here, the server 110 comprises a database 180 containing a first list L1 storing the addresses of the processing systems 130 in the distribution network able to obtain a low-resolution version of the image 203.

This first list L1 also stores the addresses of the client systems 140 possessing this low-resolution version, these systems of course being in a position to obtain, within the meaning of the present patent application, said low-resolution version from their storage memory.

In practice, when a computer system joins the distribution network according to the invention, it registers with the server 110 and supplies to it its capabilities for obtaining a low-resolution version of a digital document, these processing capabilities being stored by the server 110 in the first list L1.

It will be agreed hereinafter that, for a system storing the thumbnail 203, these obtaining capabilities are unlimited.

In the example of the distribution of digital images described here, these processing capabilities can for example represent the ability of the computer system to compress digital images in accordance with certain standards such as JPEG, GIF, JPEG2000.

Figure 3:
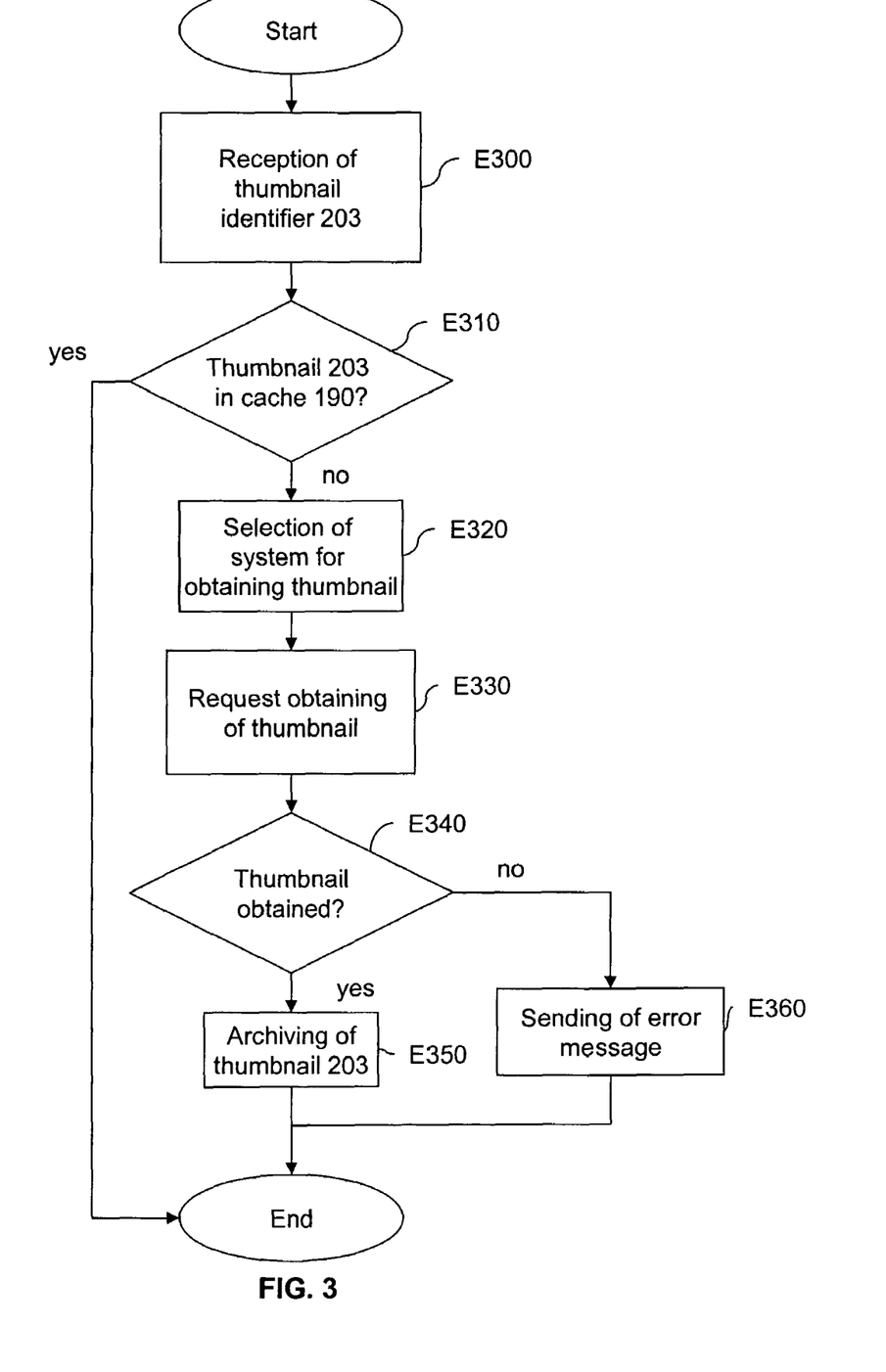
FIG. 3 depicts the main steps of an archiving method according to the invention in a particular embodiment.

FIG. 3 shows the main steps E300 to E360 of an archiving method according to the invention in a preferred embodiment in accordance with the invention.

In the example described here, it is assumed that the archiving method is implemented in a server 110.

By way of example, the case is adopted where a client system 140 wishes to share an image 203. In practice, this client system 140 already possesses at least the thumbnail 203.

According to the invention, a thumbnail 203 corresponding to a low-resolution version of an image 203 is archived on a server 110 according to the invention, in accordance with the archiving method described below.

During the first step E300 the server 110 receives:
the identifier 203 of a thumbnail coming from the client system 140, this identifier being associated with the "thumbnail" type described previously; and
possibly information representing the fact that the client system 140 is storing a high-resolution version of the image 203.

During this same step E300, the server 110 then stores in the first list L1 in its database 180 the fact that the client system 140 possesses the thumbnail 203.

If the information representing the fact that the client system 140 is storing the high-resolution version has been received, the server 110 also records in a second list L2 in its database 180 the fact that the client system 140 is a system 120 archiving the image 203.

Step E300 is followed by a test E310 during which it is sought whether the thumbnail 203 is present in a cache memory 190 of the server 110.

If such is the case, the result of the test E310 is positive and the archiving method ends.

On the other hand, if the thumbnail 203 is not present in the cache memory 190 of the server 110, the result of test E310 is negative.

This test is then followed by a step E320 of selecting a system adapted to obtain the thumbnail 203 and to supply this to the server 110.

In practice, this selection is made in two stages.

Firstly, all the systems able to supply the thumbnail 203 are sought, namely on the one hand the systems in the first list L1 storing this thumbnail and on the other hand the systems able to strictly speaking obtain this thumbnail 203 from the image 203, that is to say the systems recorded both in the first list L1 and in the second list L2.

Using the first list L1, a search is next made, amongst these systems, for the one having maximum processing capacities for obtaining and supplying the thumbnail 203 to the server 110.

In the preferred embodiment described here, the server 110 comprises means 630 of obtaining the bandwidth available on the communications network between the server 110 and a given processing system 130.

In this preferred embodiment, the bandwidth available between the server 110 and a processing system 130 is stored in the aforementioned first list L1.

Thus the step E320 of selecting the processing system is preferably performed by choosing, from the first list L1, a processing system 130 having the appropriate processing capabilities, or so that the bandwidth available on the network between the server 110 and this processing system 130 is maximum.

The step E320 of selecting the processing system 130 is followed by a step E330 during which the server 110 sends a request to obtain the thumbnail 203 to the processing system 130 selected at step E320.

The step E330 of sending the request for obtaining the thumbnail 203 is followed by a test E340 during which it is checked whether the thumbnail 203 requested at the previous step E330 has been obtained.

If such is the case, the result of test E340 is positive. This test is then followed by a step E350 during which the thumbnail 203 is archived in the cache memory 190 of the server 110.

On the other hand, if the thumbnail 203 requested at step E330 is not received, the result of test E340 is negative. In this case, test E340 is followed by a step E360 of sending an error message to the client system 140.

In another embodiment, if the result of the test E340 is negative, the step E320 of selecting a system for selecting another system able to obtain and supply the thumbnail 203 is returned to, knowing that this thumbnail 203 is at the very least available from the client system 140.

However, if this thumbnail 203 cannot definitively be obtained, the aforementioned error message is sent.

The steps E350 of archiving the thumbnail and E360 of sending the error message end the archiving method according to the invention in this embodiment.

Figure 4:
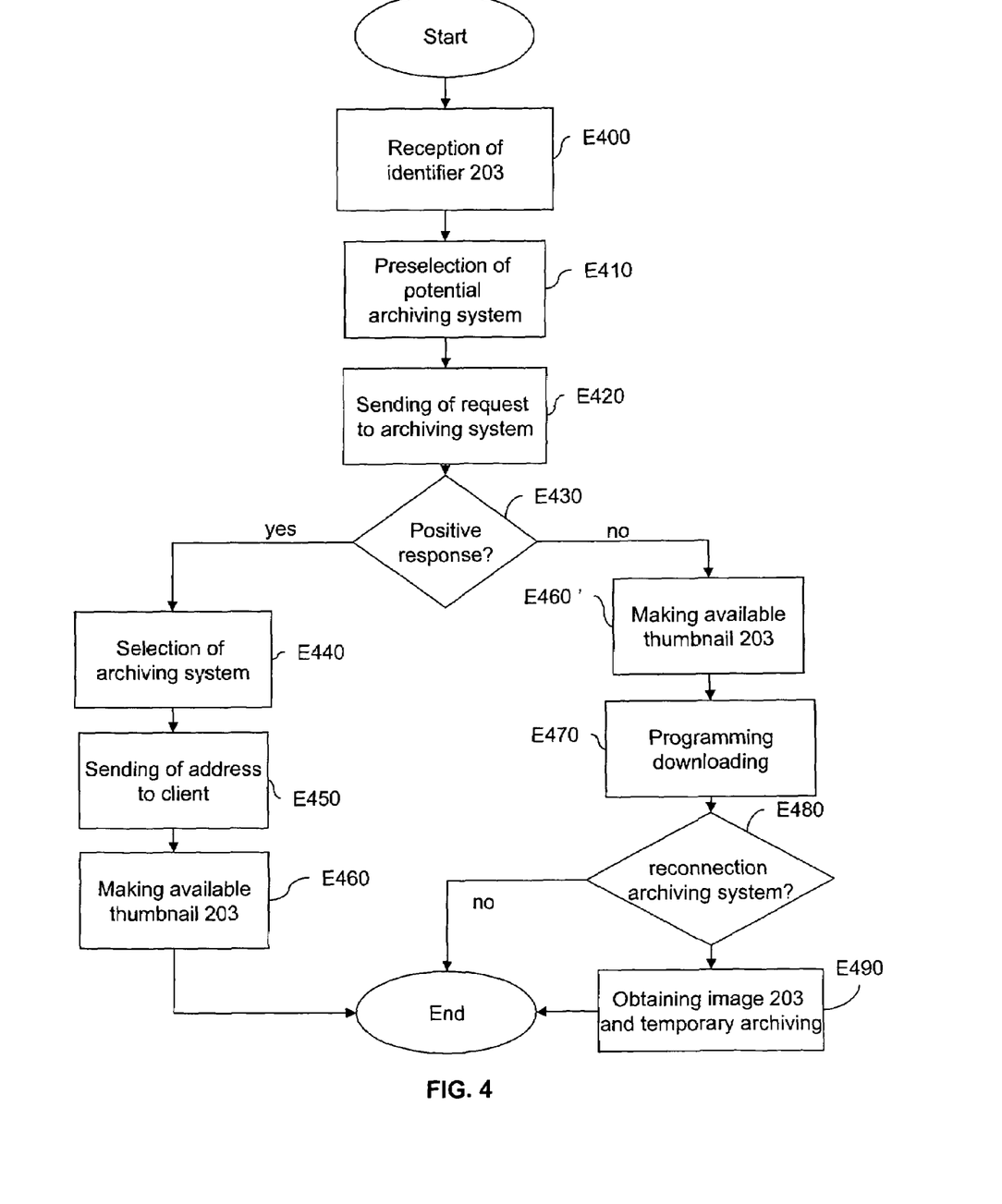
FIG. 4 depicts the main steps of a distribution method according to the invention in a particular embodiment.

FIG. 4 depicts the main steps E400 to E490 of a distribution method according to the invention in a preferred embodiment.

In the example described here, the case is adopted where a client system 140 wishes to access an image 203 and, in accordance with the invention, contacts a server 110 for this purpose, this server 110 comprising means of implementing the steps of the archiving method described here.

During a first step E400, the server 110 receives a request coming from the client system 140 with a view to obtaining the image 203.

The step E400 of receiving the request is followed by a step E410 during which the server 110 determines, from the second list L2, all the archiving systems 120 in the peer to peer network able to store the image 203.

During this step E410, the server 110 preselects an archiving system 120 from amongst the aforementioned second list L2, for example taking into account the theoretical bandwidth (56k modem, ADSL connection, etc) of this archiving system.

In a variant, the server 110 selects several archiving systems 120, or even all those stored in its second list L2.

The step E410 of preselecting one or more archiving systems 120 is followed by a step E420 during which the server 110 sends a request for obtaining the image 203 to the archiving system or systems (120) preselected during the previous step.

The step E420 of sending an obtaining request is followed by a test E430 during which the server 110 determines whether at least one archiving system 120 preselected at the previous step E410 replies that it is in a position to supply the image 203 to the client system 140.

If such is the case, the result of test E430 is positive. This test is then followed by a step E440 during which the server 110 selects an archiving system 120 amongst those which reply positively to the request sent during step E420.

Various methods of selecting the archiving system 120, in particular according to the bandwidth available between the archiving system 120 and the server 110, are known and will not be described here.

In a variant, the server 110 selects several archiving systems 120 so that the client system 140 can be capable of performing a multiple downloading from several sources possessing the image 203.

Whatever the case, during this step E440, the server 110 can send a request to this archiving system 120 for the purpose of warning it that the client system 140 will contact it directly for the downloading of the image 203.

The step E440 of selecting the archiving system and sending the aforementioned request is followed by a step E450 during which the server 110 sends to the client system 140 the address of the archiving system 120 preselected during this same step.

The step E450 of sending the address of the archiving system 120 to the client system 140 is followed by a step E460 of making the thumbnail 203 available to the client system 140.

In practice, this step of making the thumbnail 203 available consists of permitting access by the client system 140 to the thumbnail archived in the cache memory 190 of the server 110, this thumbnail 203 having been archived by an archiving method as described previously with reference to FIG. 3.

Thus, even if subsequently the client system 140 does not manage to obtain the image 203 from the archiving system 120, it can, in accordance with the invention, obtain a low-resolution version of this image 203, namely the thumbnail 203, from the server 110.

On the other hand, if none of the archiving systems contacted at step E420 responds positively to this request, the result of test E430 is negative.

This test is then followed by a second step E460' of making the thumbnail 203 available, similar to the step E460 of making the thumbnail 203 available, the second step E460' of making the thumbnail 203 available also comprising the sending of a message to the client system 140 in order to warn it that only the low-resolution version of the image 203 is available for the moment.

The second step E460' of making the thumbnail 203 available is then followed by a step E470 of programming the downloading of the high-resolution version of the digital document.

This step consists of triggering a procedure during which the server 110 regularly attempts, for a predetermined period, to download the high-resolution image 203 from the systems 120 archiving the image 203.

The programming step E470 is thus followed by a test E480 during which the server 110 regularly checks, during this predetermined period, whether an archiving system 120 containing the image 203 has reconnected to the server 110.

If such is not the case, the result of the verification test E480 is negative and, in this embodiment, the distribution method ends.

On the other hand, if at least one archiving system 120 containing the image 230 reconnects to the server 110 during the predetermined time, the result of the verification test E480 is positive.

This test is then followed by a step E490:
of obtaining the high-resolution version of the image 203 from the newly reconnected archiving system 120; and
temporary archiving of this high-resolution version in the cache memory 190 of the server 110.

In a preferred embodiment, this step E490 of obtaining the high-resolution version also comprises the sending of an information message to the client 140 in order to notify it of the temporary making available of the high-resolution version of the image 203 in the cache memory 190 of the server 110.

In practice, the high-resolution version of the image 203 is kept available in the cache memory 190 for a predetermined period.

Preferentially, the cache memory 190 keeps as a priority the newly requested images as the cache memory 190 fills up.

Whatever the case, the step E490 of obtaining the high-resolution version ends the distribution method according to the invention, in this embodiment.

In a variant, the sequence consisting of the programming step E470, the verification test E480 and the step E490 of obtaining the high-resolution version can be replaced by a step of sending an error message to the client system 140.

In a variant, the sequence consisting of the programming step E470, the verification test E480 and the step E490 of obtaining the high-resolution version is performed only at the request of the client system 140.

Figure 5:
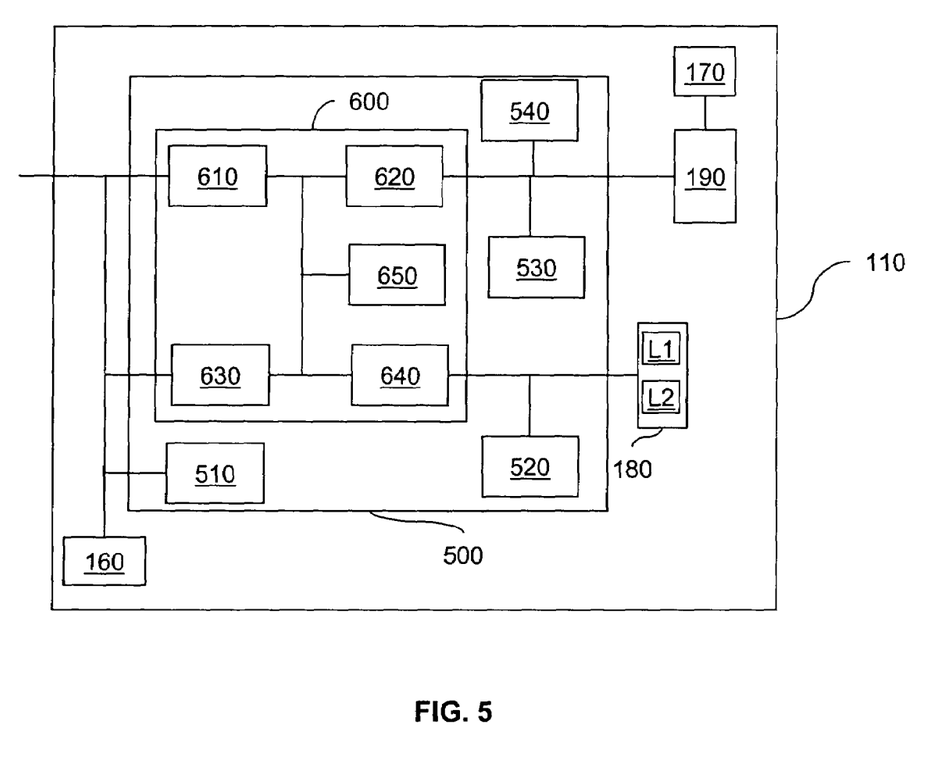
FIG. 5 depicts a server according to the invention in a particular embodiment.

FIG. 5 depicts a server 110 according to the invention in a preferred embodiment.

The server 110 comprises a distribution device 500 according to the invention. This distribution device 500 is adapted to implement an archiving method and a distribution method in accordance with the invention, such as those described previously in a preferred embodiment with reference to FIGS. 3 and 4.

The distribution device 500 comprises an archiving device 600 according to the invention which will now be described in a preferred embodiment.

The archiving device 600 comprises hardware and communication software means 610 known to persons skilled in the art, for example a network card and software drivers for controlling this card.

Preferably, these communication means are adapted to implement a communication standard such as for example the Ethernet, TCP/IP or UMTS standard.

Whatever the case these communication means 610 constitute:
means of receiving, from an archiving system 120, an identifier 203 of a digital image, uniquely identifying all the versions of this digital image;
means of sending a request to a processing system 130 in a network, with a view to obtaining a thumbnail 203; and
means of obtaining a thumbnail 203 from a processing system 130.

These communication means 610 are also adapted to determine the type associated with a single identifier 203, this type being chosen, in the example described here, from amongst the "thumbnail" and "image" types.

The communication means 610 are also adapted to receive a collection 202 of digital documents and to obtain the single identifier 203 from this collection 202.

The archiving device 600 also comprises means 620 of seeking a thumbnail 203 in a cache memory 190 of the server 110.

The cache memory 190 and the means 620 of seeking in such a memory are known to persons skilled in the art and will not be described here.

The archiving device 600 also comprises means 630 of obtaining the bandwidth available on the communication network between the server 110 and a processing system 130.

These means 630 of obtaining the bandwidth are known to persons skilled in the art. They are for example adapted to send predetermined requests to a processing system and to deduce the aforementioned available bandwidth by analyzing the response time to these requests.

In the preferred embodiment described here, these means 630 of obtaining the bandwidth store, for each processing system 130, the aforementioned bandwidth in the first list L1 in the database 180 of the server 110.

The archiving device 600 also comprises means 640 of selecting a processing system containing the thumbnail 203, this selection being made from the first list L1, according to:
the bandwidth available on the network, between the server 110 and this processing system 130; and/or
the processing capacities of this processing system 130.

The means 640 of selecting a processing system can for example select, from the first list L1 in the database 180, a processing system 130 having the maximum available bandwidth on the network with the server 110.

The archiving device 600 also comprises means 650 of archiving the thumbnail 203 in the cache memory 190 of the server 110. These archiving means 650 are known to persons skilled in the art and will not be described here.

The distribution device 500 also comprises communication means 510 identical, in the preferred embodiment described here, to the communication means 610 of the archiving device 300 described previously.

The communication means 510 of the distribution device 500 constitute in particular:
means of receiving a request from a client system 140 with a view to obtaining the high-resolution version of a digital document;
means of sending to this client system 140, on reception of this request, the address of an archiving system 120 selected by selection means 520 as described below.

The communication means 510 are adapted to store, in the second list L2 in the database 180 of the server 110, the address of all the archiving systems 120 able to store the image 203.

The communication means 510 are also adapted to download, from an archiving system 120, the high-resolution version of the digital document 203 in a memory of the server 110 and to notify the client system 140, following on from the downloading, of the temporary making available of the high-resolution version of the image 203 in said memory of the server 110.

The distribution device 500 described here also comprises verification means 540 adapted to regularly check, for a predetermined period, whether at least one archiving system 120 containing the high-resolution version of the image 203 has reconnected to the server 110.

In practice, the verification means 540 carry out this verification by regular analysis of the second list L2.

The distribution device 500 comprises means 520 of selecting an archiving system 120 able to store the image 203.

These means 520 of selecting an archiving system are in particular adapted to:
obtain the addresses of the archiving system 120 in the second list L2 in the database 180 of the server 110; and
select an archiving system 120 according to its computing capacities, its capacities being stored in the second list L2.

The distribution system 500 also comprises means 530 of making the thumbnail 203 available to the client system 140.

In a preferred embodiment, these means 530 of making the thumbnail 203 available comprise authentication means adapted to check that the client system 140 is authorized to gain access to the thumbnail 203, for example by checking a password.

In the preferred embodiment described here, the server 110 also comprises communication means (160) known to persons skilled in the art, these communication means (160) being adapted to:
receive a request to print a digital document coming from a client system;
download a digital document coming from an archiving system 120; and
send a message to a client system 120 in order to inform it that an image 203 is at least temporarily available in its cache memory 190.

In this preferred embodiment, the server 110 also comprises printing means 170. It can thus be used for implementing a remote digital document printing service.

According to this service, a client system 140 possessing the identifier 203 of a high-resolution image sends the print request to the server 110, which obtains the digital document from an archiving system 120 in the distribution network.

The printed document can then be sent to a user of the client system 140, for example by mail.

In a preferred embodiment, the server also comprises means of programming the downloading of the high-resolution version of the digital document.

These means are adapted to trigger a procedure during which the server 110 regularly attempts, for a predetermined period, to download the image 203 from the systems 120 archiving the image 203.

The invention is not limited to the archiving and distribution of digital images but also applies to the archiving and distribution of any multiresolution digital document.

It finds in particular an application for the archiving and distribution of digital videos, digital audio documents, or text files, the low-resolution versions of these documents being for example able to be extracted from these documents.

The invention claimed is:

1. A digital image sharing apparatus, which is connected to an archiving apparatus storing a high resolution version of a digital image via to a network, said digital image sharing apparatus storing a low resolution version of the digital image previously, said digital image sharing apparatus comprising:
an obtaining request reception unit adapted to receive, from a client apparatus, an obtaining request for obtaining the high resolution version of the digital image;
a determining unit adapted to determine whether the archiving apparatus can supply the high resolution version of the digital image to the client apparatus, in response to the reception of the obtaining request;
a transmission unit adapted to transmit an address of the archiving apparatus to the client apparatus in response to the obtaining request, if the determining unit determines that the archiving apparatus can supply the high resolution version of the digital image to the client apparatus, or transmit the low resolution version of the digital image to the client apparatus in response to the obtaining request, if the determining unit determines that the archiving apparatus cannot supply the high resolution version of the digital image to the client apparatus;

a download unit adapted to download the high resolution version of the digital image from the archiving apparatus, if the determining unit determines that the archiving apparatus cannot supply the high resolution version of the digital image to the client apparatus; and a notifying unit adapted to notify the client apparatus after the download unit downloads the high resolution version of the digital image from the archiving apparatus.

2. An apparatus according to claim 1, further comprising:
a selection unit adapted to select one computer, as the archiving apparatus, from a plurality of computers which are storing the high resolution version of the digital image,
wherein the transmission unit transmits the address of the selected archiving apparatus to the client apparatus.

3. An apparatus according to claim 1, wherein the obtaining request reception unit receives a unique identifier that identifies versions of the digital image.

4. An apparatus according to claim 1, further comprising:
a print request reception unit adapted to receive a print request to print the digital image;
a print unit adapted to print the high resolution version of the digital image,
wherein said download unit is adapted to download the high resolution version of the digital image from the archiving apparatus responsive to receipt of print request by said print request reception unit.

5. A method of controlling a digital image sharing apparatus, which is connected to an archiving apparatus storing high resolution version of a digital image via a network, said digital image sharing apparatus storing a low resolution version of the digital image, said method comprising the steps of:
obtaining, from a client apparatus, an obtaining request for obtaining the high resolution version of the digital image;
determining whether the archiving apparatus can supply the high resolution version of the digital image to the client apparatus, in response to the reception of the obtaining request;
transmitting an address of the archiving apparatus to the client apparatus in response to the obtaining request, if the result of the determination indicates that the archiving apparatus can supply the high resolution version of the digital image to the client apparatus, or transmitting the low resolution version of the digital image to the client apparatus in response to the obtaining request, if the result of the determination indicates that the archiving apparatus cannot supply the high resolution version of the digital image to the client apparatus;
downloading the high resolution version of the digital image from the archiving apparatus, if the result of the determination indicates that the archiving apparatus cannot supply the high resolution version of the digital image to the client apparatus; and
notifying the client apparatus after the download unit downloads the high resolution version of the digital image from the archiving apparatus.

6. An information storage medium readable by a computer system, said information storage medium storing a program executable by a processor for instructing a digital image sharing apparatus, which is connected to an archiving apparatus storing a high resolution version of a digital image, the digital image sharing apparatus storing a low resolution version of the digital image previously, to perform the steps of:
obtaining, from a client apparatus, an obtaining request for obtaining the high resolution version of the digital image;
determining whether the archiving apparatus can supply the high resolution version of the digital image to the client apparatus, in response to the reception of the obtaining request;
transmitting an address of the archiving apparatus to the client apparatus in response to the obtaining request, if the result of the determination indicates that the archiving apparatus can supply the high resolution version of the digital image to the client apparatus, or transmitting the low resolution version of the digital image to the client apparatus in response to the obtaining request, if the result of the determination indicates that the archiving apparatus cannot supply the high resolution version of the digital image to the client apparatus;
downloading the high resolution version of the digital image from the archiving apparatus, if the result of the determination indicates that the archiving apparatus cannot supply the high resolution version of the digital image to the client apparatus; and
notifying the client apparatus after the download unit downloads the high resolution version of the digital image from the archiving apparatus.

7. An apparatus according to claim 1, further comprising a check unit adapted to make a regular check as to whether the archiving apparatus is connected to the digital image sharing apparatus, wherein the download unit downloads the high resolution version of the digital image from the archiving apparatus, if the checking unit determines that the archiving apparatus is connected to the digital image sharing apparatus.

8. An apparatus according to the claim 1, wherein said digital image sharing apparatus keeps the low resolution version of the digital image available in a memory for a predetermined period.

* * * * *